United States Patent [19]

Fernandez-Rana et al.

[11] 3,881,718
[45] May 6, 1975

[54] UNSTACKING AND SHINGLING OF SHEET MATERIAL ARTICLES

[75] Inventors: Victoriano Fernandez-Rana; Carlton V. Hageman, both of Easton, Pa.

[73] Assignee: Harris-Intertype Corporation, Cleveland, Ohio

[22] Filed: Mar. 19, 1973

[21] Appl. No.: 342,739

[52] U.S. Cl. .................. 271/10; 271/109; 271/150
[51] Int. Cl. .......................... B65h 1/02; B65h 3/32
[58] Field of Search ......... 271/149, 150, 45, 49, 10, 271/151, 52, 59, 109, 34, 113, 119, 126, 157, 69, 270; 214/8.5 A, 8.5 B, 8.5 G, 8.5 H, 8.5 K

[56] References Cited
UNITED STATES PATENTS

| | | | |
|---|---|---|---|
| 2,273,618 | 2/1942 | Breyley | 214/8.5 K |
| 2,606,762 | 8/1952 | Wockenfuss | 271/149 X |
| 2,715,975 | 8/1955 | Doane et al. | 271/10 X |
| 3,459,420 | 8/1969 | Huntwork | 271/45 |
| 3,643,939 | 2/1972 | Nussbaum et al. | 271/10 |
| 3,690,650 | 9/1972 | Maier et al. | 271/211 |

*Primary Examiner*—Evon C. Blunk
*Assistant Examiner*—Bruce H. Stoner, Jr.

[57] ABSTRACT

An improved method and apparatus are provided for removing a densely shingled series of folded sheet material articles from a storage tray and moving the sheet material articles into a loosely shingled overlapping stream. The series of sheet material articles is transferred to a multiple of spaced-apart conveyor belts in a first conveyor assembly by moving the tray downwardly through a space between the conveyor belts. As the tray moves downwardly, the lowermost edge portions of the sheet material articles are supportingly engaged by longitudinally extending upper runs of the conveyor belts. The forwardmost article in the series of sheet material articles is held in an on-edge orientation by a plurality of sprocket wheels. As the conveyor belts advance the series of sheet material articles, the sprocket wheels are rotated to sequentially release or separate the sheet material articles. The released sheet material articles are moved to a second conveyor assembly by a transfer conveyor. The transfer conveyor is retractable from a position in which it extends between the conveyor belts of the first conveyor assembly to enable the tray to move through the space between the conveyor belts. To provide for the disposition of the sheet material articles on the second conveyor assembly in an overlapping stream, the transfer conveyor is driven at a higher speed than the first conveyor assembly and the second conveyor assembly is driven at a higher speed than the transfer conveyor.

25 Claims, 5 Drawing Figures

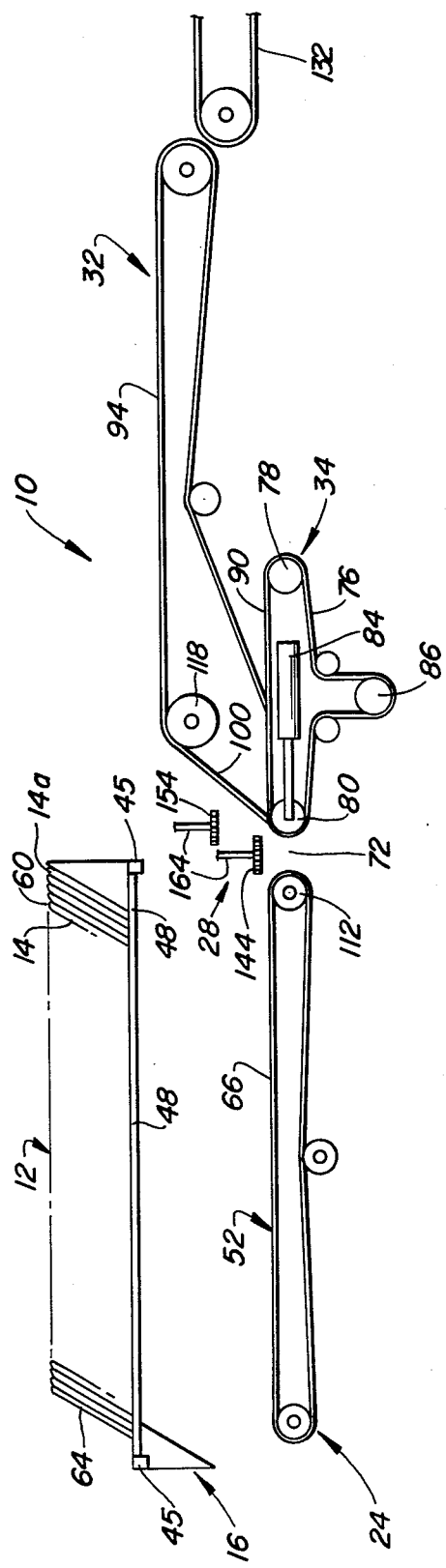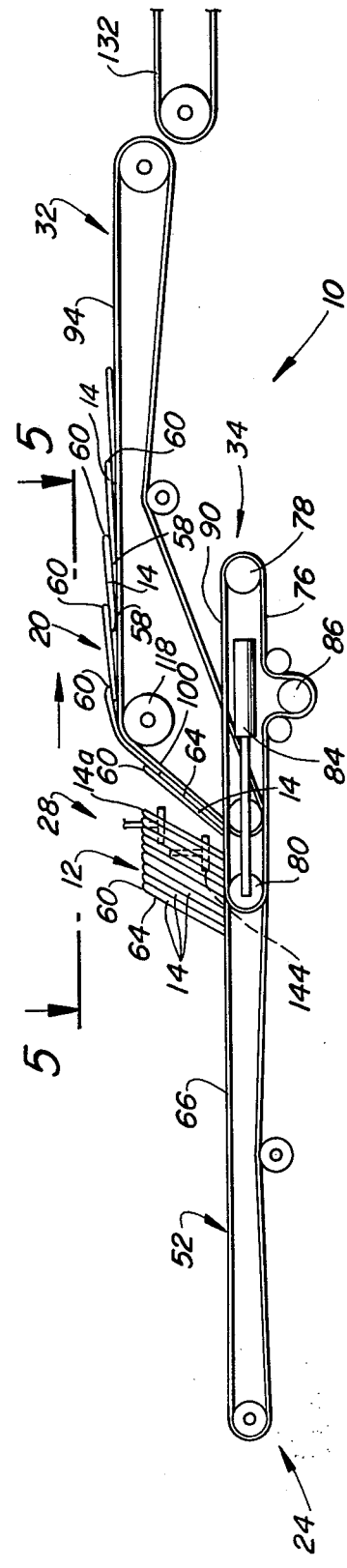

3,881,718

UNSTACKING AND SHINGLING OF SHEET MATERIAL ARTICLES

BACKGROUND OF THE INVENTION

This invention relates to a sheet-handling method and an apparatus for removing a series of folded sheet material articles from a support tray and moving the articles into an overlapping stream.

A method and apparatus for depositing a series of newspaper sections or other sheet material articles in a densely shingled relationship on a storage tray are disclosed in U.S. application Ser. No. 302,848, filed Nov. 1, 1972 by James C. Wise and Victoriano F. Rana, and entitled Method and Apparatus for Storing Sheet material Articles. When the newspaper sections are to be associated to form a complete newspaper, it is necessary to remove the densely shingled series of newspaper sections from the storage tray and move them into a loosely shingled overlapping stream. One suitable type of apparatus for associating newspaper sections to form a complete newspaper is disclosed in U.S. Pat. No. 3,663,008.

SUMMARY OF THE INVENTION

The present invention provides an improved method and apparatus for transferring a densely shingled series of newspaper sections or other sheet material articles from a tray to a loosely shingled overlapping stream. When the densely shingled series of newspaper sections are to be removed from the tray, the tray is lowered downwardly between conveyor belts. As the tray moves downwardly, lower end portions of the newspaper sections are engaged by the spaced-apart conveyor belts. The forwardmost newspaper section in the series of newspaper sections is held in the upright orientation by movable members which engage opposite side edge portions of the forwardmost newspaper section. These members are moved relative to the series of newspaper sections to sequentially release or separate the newspaper sections.

The released newspaper sections are engaged by a conveyor assembly which moves them forwardly at a speed which is greater than the speed at which the series of densely shingled newspaper sections is advanced by the conveyor belts. This results in the leading end portions of the newspaper sections being spaced apart to form a loosely shingled overlapping stream. To assist in the transfer of the released newspaper sections from the conveyor belts to the conveyor assembly, a retractable transfer conveyor engages the lowermost end portion of the newspaper sections and accelerates them to a speed which is faster than the speed at which the series of densely shingled newspaper sections are moved by the conveyor belts and is less than the speed at which the stream of newspaper sections is moved by the conveyor assembly.

Accordingly, it is an object of the invention to provide a new and improved method and apparatus for use in removing a series of sheet material articles from a tray and moving the sheet material articles into an overlapping stream.

Another object of the invention is to provide a new and improved apparatus which includes a first conveyor assembly which receives a series of sheet material articles in an on-edge orientation from a tray, an apparatus for sequentially releasing the sheet material articles from the series of sheet material articles and a second conveyor assembly which receives each of the released sheet material articles in turn and transports them in an overlapped stream.

Another object of this invention is to provide a new and improved method of handling sheet material articles which includes the steps of transferring a series of folded on-edge sheet material articles from a tray to a first conveyor assembly, sequentially releasing articles from the series of sheet material articles, and then transporting the released sheet material articles in an overlapping stream with a second conveyor assembly.

BRIEF DESCRIPTION OF THE DRAWINGS

The foregoing and other objects and features of the present invention will become more apparent upon a consideration of the following description taken in connection with the accompanying drawings wherein:

FIG. 2 is a schematic elevational sectional view illustrating a transfer conveyor in a retracted condition;

FIG. 3 is a schematic elevational sectional view, similar to FIG. 2, illustrating the transfer conveyor assembly in an extended condition;

DESCRIPTION OF ONE EMBODIMENT OF THE INVENTION

Figure 1:
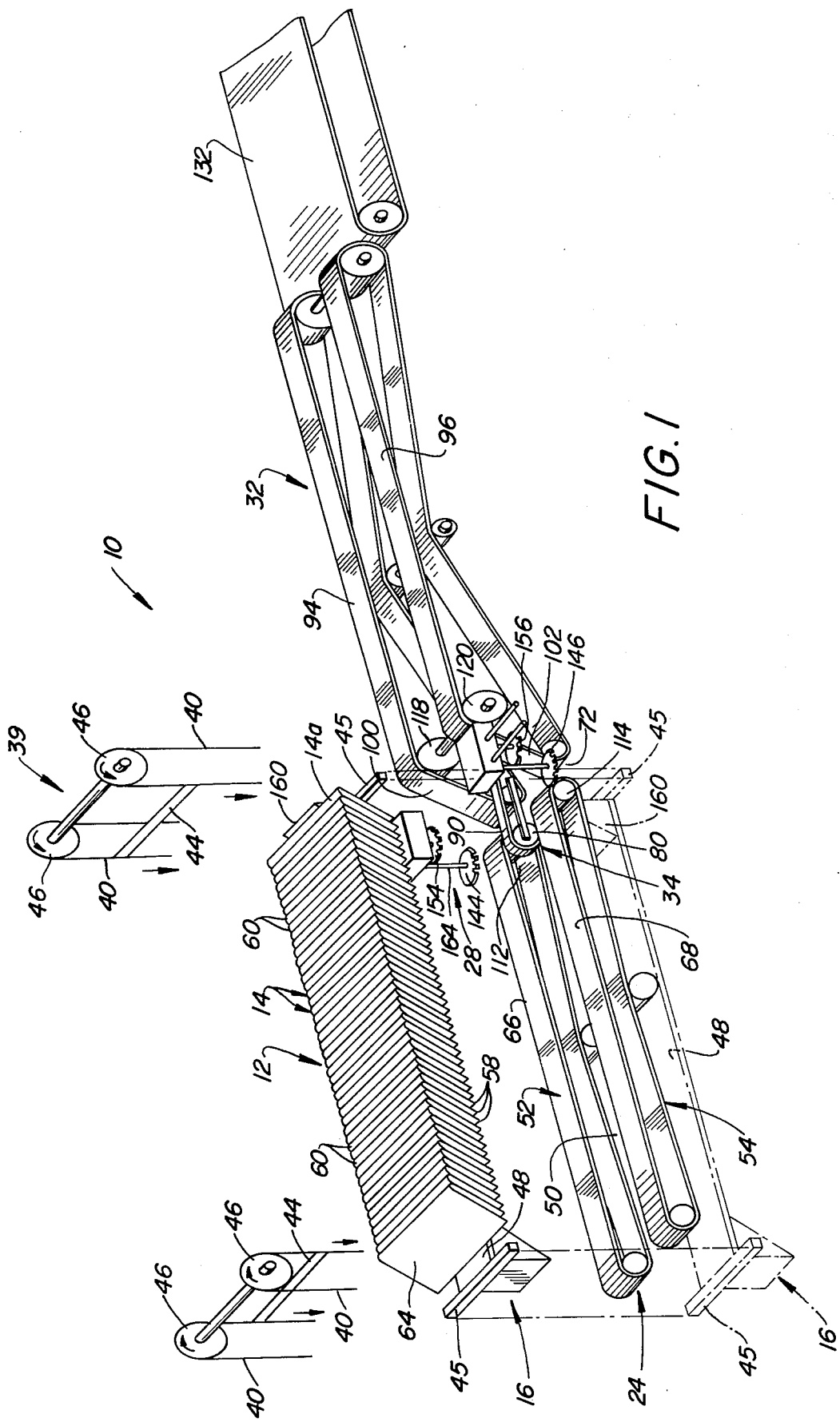
FIG. 1 is a schematic illustration of an unloader assembly constructed in accordance with the present invention.

An unloader assembly 10 constructed in accordance with the present invention is illustrated in FIG. 1 and is utilized to remove a densely shingled series 12 of newspaper sections 14 from a storage tray 16 and to move the newspaper sections into a loosely shingled overlapping stream 20 (see FIG. 3). The unloader assembly 10 includes a first conveyor assembly 24 which receives the series 12 of newspaper sections 14 from the support tray 16. The forwardmost newspaper section 14a is held in an on-edge orientation by a gating assembly 28 which sequentially releases the newspaper sections 14 for movement to a second conveyor assembly 32. Each of the released newspaper sections 14 is transferred from the first conveyor assembly 24 to the second conveyor assembly 32 by a transfer conveyor assembly 34. To enable the newspaper sections 14 to form the loosely shingled overlapping stream 20 on the second conveyor assembly 32, a drive assembly 38 (see FIG. 4) drives the second conveyor assembly 32 at a greater speed than the first conveyor assembly 24.

To initiate the transfer of the densely shingled series 12 of newspaper sections 14 from the tray 16 to the conveyor assembly 24, the tray is lowered by a suitable elevator assembly 39. The elevator assembly 39 includes four sets of chains 40 and crossbars 44. The crossbars engage the ends 45 of the support tray 16. Drive sprockets 46 are driven to move the chains in the direction of the arrows in FIG. 1 to lower the bars 44 at the same speed and in horizontal alignment. This results in a longitudinally extending support panel or section 48 of the storage tray 16 being held in a horizontal position as the support tray is lowered by the elevator assembly 39.

As the support tray 16 is lowered, the support panel or section 48 moves through a space 50 between a pair of conveyor belts 52 and 54. The length of the tray 16 is such that the end portions 45 are disposed outwardly of the ends of the conveyor belts 52 and 54 so that they do not interfere with movement of the support tray 16 from the position shown in solid lines in FIG. 1 to the position shown in dashed lines in FIG. 1. Continued downward movement of the elevator chains 40 moves them around suitable idler sprockets (not shown) so that the support bars 44 move apart and release the tray 16.

As the tray 16 moves between the two conveyor belts 52 and 54, the series of newspaper sections 14 is deposited on the conveyor belts. Thus, the spacing between the conveyor belts is less than the width of the newspaper sections 14 so that the lowermost end portion 58 of each of the newspaper sections 14 moves into engagement with the two conveyor belts 52 and 54. In the preferred embodiment, the folded edge of the newspaper sections is uppermost and the lower edge is open, although the newspapers can be arranged with the open edge up. As a result, in the preferred embodiment, the series 12 of the newspaper sections is supported on the two conveyor belts with folded end portions 60 of the newspaper sections 14 uppermost and extending generally horizontally. The side or major surfaces 64 of the newspaper sections 14 are disposed in abutting engagement with each other and extend upwardly at an acute angle relative to straight horizontally extending upper runs 66 and 68 of the conveyor belts 52 and 54. As the series 12 of the newspaper sections are deposited on the conveyor belts 52 and 54, the gating assembly 28 engages the forwardmost newspaper section 14a to hold the newspaper sections in this upwardly sloping on-edge orientation. Thus, by merely moving the tray 16 downwardly with the elevator assembly 38, the series 12 of the newspaper sections 14 are transferred from the tray to the first conveyor assembly 24.

As the tray 16 moves downwardly, it is necessary for one end portion 45 of the tray 16 to move through a space 72 between the first conveyor assembly 24 and the second conveyor assembly 32. To open the space 72 for passage of the end portion 45 of the support tray 16, the transfer conveyor 34 is moved from the extended condition of FIGS. 1 and 3 to the retracted condition of FIG. 2. When the transfer conveyor 34 is in the retracted condition of FIG. 2, the space 72 is unobstructed so that the forwardmost end portion 45 of the support tray 16 can pass through the space. Once the support tray 16 has moved beneath the first conveyor assembly 24, the transfer conveyor 34 is moved from the retracted condition of FIG. 2 to the extended condition of FIGS. 1 and 3.

The portion 58 of each of the newspaper sections 14 moves into engagement with the transfer conveyor 34 as the newspaper section is released in turn by the gating assembly 28. The transfer conveyor 34 includes a conveyor belt 76 which extends around a drive roller 78 and a movable idler roller 80. An actuator mechanism 84 is connected to the idler roller 80 and is operable to move the idler roller between the retracted position of FIG. 2 and the extended position of FIG. 3. A dancer roll 86 applies a constant biasing force to the conveyor belt 76 to maintain it in taut engagement with the drive and idler rollers 78 and 80.

When the transfer conveyor 34 is in the extended position of FIG. 3, an upper run 90 of the conveyor belt 76 extends horizontally from the space 50 between the two conveyor belts 52 and 54 of the first conveyor assembly 24 (see FIG. 1) into the space between a pair of conveyor belts 94 and 96 of the second conveyor assembly 32. The transfer conveyor assembly 34 is in the extended condition of FIG. 3 whenever newspaper sections 14 are released from the series 12 of newspaper sections by the gating assembly 28. Therefore, the upper run 90 of the transfer conveyor assembly 34 will engage the open lower end portion 58 of a released newspaper section 14. Since the drive roller 78 is driven in a clockwise direction (as viewed in FIG. 3), the upper run 90 of the transfer conveyor 34 moves the released newspaper section 14 into engagement with the second conveyor assembly 32.

As the released newspaper section 14 is moved forwardly by the transfer conveyor assembly 34, a flat side surface 64 of the newspaper section moves into engagement with upwardly sloping sections 100 and 102 of the conveyor belts 94 and 96. The conveyor belts 94 and 96 move the engaged newspaper section upwardly away from the transfer conveyor 34 and into the overlapping stream 20 of newspaper sections (see FIG. 3). The two conveyor belts 94 and 96 move the engaged newspaper section upwardly away from the transfer conveyor 34 and into the overlapping stream 20 of newspaper sections (see FIG. 3). The two conveyor belts 94 and 96 of the second conveyor assembly 32 are disposed in longitudinal alignment with the conveyor belts 52 and 54 of the first conveyor assembly 24. By utilizing two spaced apart conveyor belts, in each conveyor assembly, that is, the conveyor belts 52 and 54 and the set of conveyor belts 94 and 96, the transfer conveyor 34 can be centrally disposed. However, it is contemplated that the conveyor assemblies 24 and 32 could be provided with a single relatively wide belt and the transfer conveyor 34 could be provided with two retractable belts disposed adjacent the opposite sides of the first and second conveyor assemblies.

To provide for the formation of the newspaper sections 14 into the loosely shingled overlapping stream 20, it is necessary to have the end portion 60 of the newspaper sections 14 spaced apart as they are moved under the influence of the second conveyor assembly 32. However, the portions 60 of the newspaper sections 14 are closely adjacent each other when they are disposed in the densely shingled series 12. To provide for this separation between the portions of the newspaper sections 14 on the second conveyor 32, the second conveyor 32 is driven by the drive assembly 38 at a higher speed than the first conveyor assembly 24.

Figure 4:
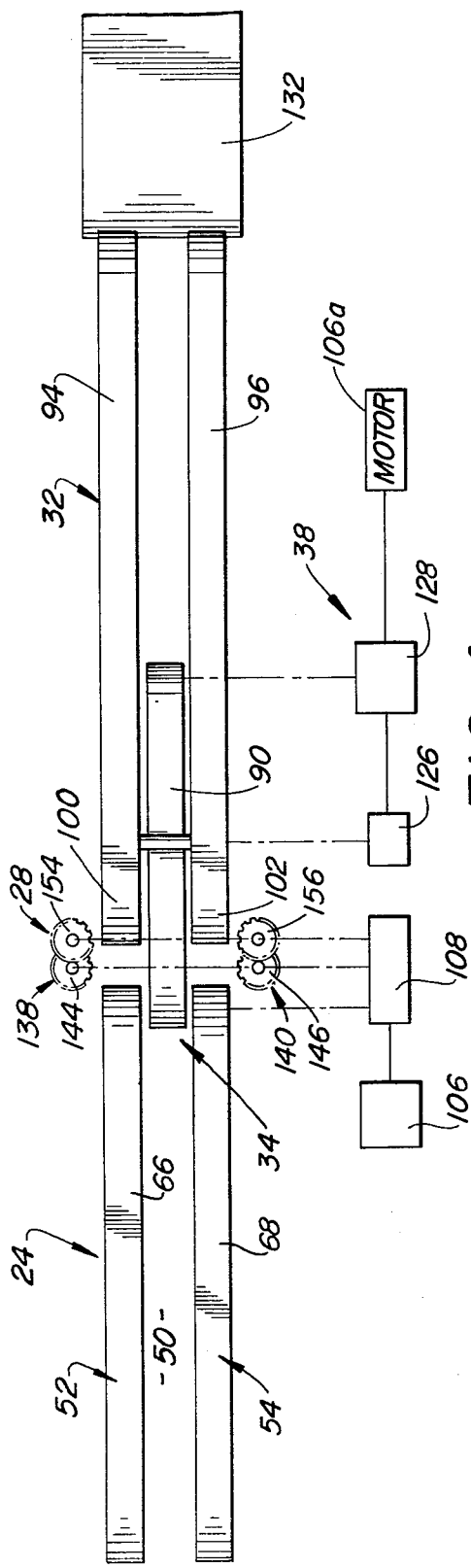
FIG. 4 is a schematic plan view illustrating the relationship between a plurality of conveyor assemblies, sprocket wheels for holding sheet material articles in an upright orientation on one of the conveyor assemblies, and a drive arrangement for the sprocket wheels and the conveyor assemblies.

The separation of the leading end portions 60 of the newspaper sections 14 is further facilitated by driving the transfer conveyor 34 at a speed which is greater than the speed at which the first conveyor assembly 24 is driven by the drive assembly 38 (see FIG. 4). To tend to minimize the rate at which the newspaper sections are accelerated by either the second conveyor assembly 32 or the transfer conveyor 34, the transfer conveyor is driven at a speed which is somewhat less than the speed at which the second conveyor assembly is driven but greater than the speed at which the first conveyor assembly 24 is driven.

The drive assembly 38 drives the conveyors 24, 32 and 34 from a common motor 106 (FIG. 4). The motor 106 is connected through a gearbox 108 to a driver roller 112 (FIG. 1) for the conveyor belt 52 and a driver roller 114 for the conveyor belt 54. A separate motor 106a is connected with drive rollers 118, 120 for the conveyor belts 94, 96 through a gearbox 126. Also, the motor 106a is connected with the drive roller 78 for the transfer conveyor 34 through a gearbox 128.

The output speed from the gear box 108 (FIG. 4) is such that the conveyor belts 52 and 54 of the first conveyor assembly 24 are driven at relatively low speed so that the series 12 of newspaper sections 14 are advanced slowly forwardly. The output from the gearbox 128 is such that the belt 76 of the transfer conveyor assembly 34 is driven at a higher speed to accelerate each released newspaper section 14 in turn as it moves from the first conveyor assembly 24 to the second conveyor assembly 32. Finally, the second conveyor assembly 32 may be driven at an even higher speed by the output from the gearbox 126. It should be understood that the speed relationships between the conveyor assemblies 24, 32 and 34 may vary and depend upon the thickness of the product and extent of the lap of the product required by the machine downstream. It should also be noted that a receiving conveyor assembly 132 (see FIG. 1) preferably is driven at the same speed as the second conveyor assembly 32 so that the loosely shingled overlapping stream 20 of newspaper sections 14 moves smoothly from the second conveyor assembly 32 onto the receiving conveyor assembly 132.

Figure 5:
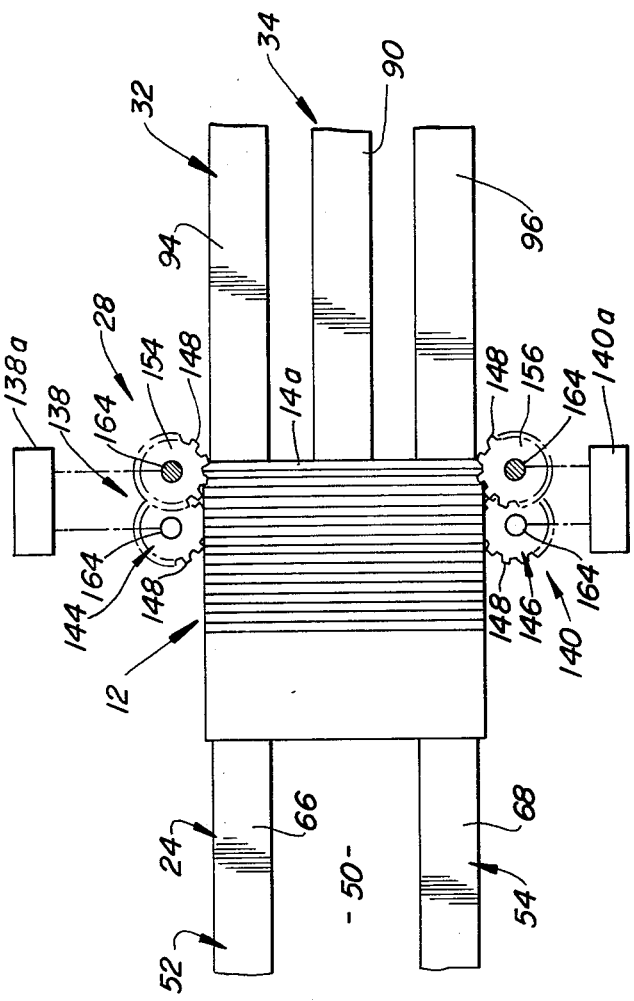
FIG. 5 is an enlarged schematic plan view, taken along the line 5—5 of FIG. 3, illustrating the relationship between the sprocket wheels and a series of sheet material articles.

The gating assembly 28 holds the forwardmost newspaper section 14a in an on-edge orientation and sequentially releases the newspaper sections for movement from the first conveyor assembly 24 to the second conveyor assembly 23 under the influence of the transfer conveyor 34. The gating assembly 28 includes two sets of sprockets 138 and 140 which are disposed adjacent to opposite sides of the first conveyor assembly 24 (see FIGS. 4 and 5). The sets of sprockets 138 and 140 are driven by the output from the gearbox 108 (FIG. 4) to release the newspaper sections 14 at the same rate as the newspaper sections are moved forwardly by the first conveyor assembly 24. This prevents a jamming or backing-up of the newspaper sections in the gating assembly 28. Moreover, each set of sprockets 138, 140 is supported for lateral movement toward and away from the belts 52, 54 and a suitable means 138a, 140a shown schematically in FIG. 5 is provided to effect such movement so that the sprockets are properly positioned relative to the newspaper sections.

The two sets of sprockets 138 and 140 include a pair of lower sprockets 144 and 146 which are spaced apart by a distance which is less than the width of one of the newspaper sections 14. Therefore, radially projecting teeth 148 on the sprocket wheels 144 and 146 engage side end portions of the forwardmost newspaper section 14a to hold the forwardmost newspaper section 14a in an on-edge orientation. Upon rotation of the sprocket 144 in a counterclockwise direction and the sprocket 146 in a clockwise direction (as viewed in FIG. 5), the forwardmost newspaper section 14a is moved forwardly by the teeth 148 on the sprocket wheels 144, 146 at the same speed at which it is moved forwardly by the conveyor belts 52 and 54. This results in a releasing of the forwardmost newspaper section 14a for movement into engagement with the transfer conveyor assembly 34. It should be noted that the sprocket teeth 148 are spaced apart by a distance which is at least as great as the thickness of a newspaper section 14.

To provide for advancement of the forwardmost newspaper section 14a at the same speed at which the newspaper sections are advanced by the first conveyor assembly 24, the sprockets 144, 146 are rotated so that the teeth 148 move with substantially the same angular velocity as the velocity at which the upper runs 66 and 68 of the conveyor belts 52 and 54 are moved. As previously explained, this is accomplished by driving the sprockets 144, 146 from the gearbox 108.

The newspaper sections 14 are initially supported on the storage tray 16 in an on-edge orientation with the flat side surfaces 64 of the newspaper sections extending upwardly at an acute angle relative to the support panel 48. To facilitate a smooth transfer of the densely shingled series 12 of newspaper sections from the tray 16 to the first conveyor assembly 24, the gating assembly 28 supports the forwardmost newspaper section 14a in the series 12 of newspaper sections in the same angular orientation as they were disposed on the tray 16. Thus, each set of sprockers 138 and 140 includes the lower sprockets 144 and 146 and upper sprockets 154 and 156 which are spaced relative to each other to support the forwardmost newspaper section 14 in the same angular relationship in which it is supported on a block 160 (see FIG. 1) connected to the support tray 16. For example, if the block 160 was provided with a support surface which was angled at 45° relative to the support panel 48 of the tray 16, the upper and lower sprockets 144 and 154 of the sprocket set 138 and the upper and lower sprockets 146 and 156 of the sprocket set 140 would be spaced so that they would support the forwardmost newspaper section 14a at an angle of 45° relative to the horizontal upper runs 66 and 68 on the conveyor belts 52 and 54.

The upper sprockets 154 and 156 are disposed forwardly of the lower sprockets 144 and 146. To provide for this relative displacement between the sprockets 144 and 154 and the sprockets 146 and 156, the sprockets are rotated by vertically extending drive shafts 164 which are offset in the manner shown in FIGS. 2 and 5. Of course, the sprockets 144 and 146, 154 and 156 are driven so as to have the same peripheral speed to effect a smooth transfer of the forwardmost newspaper section 14a from the series 12 of newspaper sections to the transfer conveyor assembly 34.

The forwardly or upwardly sloping runs 100 and 102 of the conveyor belts 94 and 96 engage the forwardly sloping surface 64 of a newspaper section which has been forwarded in an on-edge orientation by the transfer conveyor assembly 34. The upper end portion 60 of a released newspaper section 14 will tend to fall over, that is, to move in a clockwise direction as viewed in FIG. 3. However, since the belt 76 of the transfer conveyor assembly 34 accelerates the lower end portion 58 of the newspaper section, it is moved into smooth engagement with the second conveyor assembly 32.

The gating assembly 28 holds the newspaper sections 14 in the series 12 newspaper sections in the on-edge or upwardly sloping orientation shown in FIG. 3. This prevents the full weight of the series 12 of newspaper sections 14 from being applied against a newspaper section being accelerated by the second conveyor assembly 32. If the forwardmost newspaper section 14a of the series 12 of newspaper sections pressed against a preceding newspaper section being accelerated by the second conveyor assembly 32, the forward side surface 64 of the accelerating newspaper section would be moved forwardly at a higher speed than the rearward side of the newspaper section due to the frictional retarding effect caused by the weight of the series of newspaper sections. This would cause the accelerating newspaper section to tend to unfold or open up as it was engaged by the second conveyor assembly 32. Of course, such an unfolding of a newspaper section would detract from suitable operation of the unloader assembly 10.

In view of the foregoing description, it can be seen that the unloader assembly 10 of the preferred construction includes a first conveyor assembly 24 to receive a series 12 of newspaper sections 14 in on-edge orientation from a tray 16. The conveyor assembly 24 moves the series 12 of newspaper sections 14 forwardly with the folded end portions 60 of the newspaper sections uppermost. The gating assembly 28 engages the side edge portions of the forwardmost newspaper section 14a (see FIG. 5) intermediate the open lower end portion 58 and folded upper end portion 60 of the newspaper section to hold the forwardmost newspaper section in an on-edge orientation on the conveyor belts 52 and 54. As the sprockets 144, 146, 154, and 156 in the gating assembly 28 are rotated, the newspaper sections 14 are sequentially released for forward movement into engagement with the second conveyor assembly 32. The second conveyor assembly 32 accelerates the newspaper sections to move them into an overlapping stream 20 of newspaper sections. This overlapping stream 20 of newspaper sections is carried by the received conveyor assembly 132 to a suitable receiving apparatus.

Although the unloader assembly 10 has been described herein in connection with newspaper sections 14, it is contemplated that the unloader assembly could be utilized with sheet material articles other than newspaper sections. In addition, it should be understood that although the gating assembly 28 has been disclosed as having a plurality of sprocket wheels which engage the forwardmost newspaper section, other moveable members could be utilized to effect a gating of the newspaper sections. For example, it is contemplated that under certain operating conditions it may be desirable to utilize wedge members to hold the newspaper sections 14.

Having thus described one specific preferred embodiment of the invention, the following is claimed:

1. An apparatus for receiving an on-edge series of folded sheet material articles from a support tray and for moving the sheet material articles into an overlapping stream, said apparatus comprising first conveyor means for receiving the series of sheet material articles in an on-edge orientation from the tray and for moving the series of sheet material articles forwardly with first end portions of the sheet material articles uppermost, said first conveyor means including first surface means for engaging second end portions of the sheet material articles disposed opposite from the first end portions of the sheet material articles and for supporting the sheet material articles in an on-edge orientation with side surfaces of the articles disposed in abutting engagement, means for engaging a forwardmost article in the series of sheet material articles at a location intermediate its end portions to hold the series of sheet material articles in an on-edge orientation and for sequentially separating a forwardmost sheet material article from the series, and second conveyor means for receiving each of the released sheet material articles in turn from said first conveyor means and for transporting the sheet material articles in an overlapped stream with the first end portions of adjacent sheet material articles spaced apart and the first end portions of the sheet material articles leading their respective second end portions, said second conveyor means including second surface means for engaging the side surfaces of the sheet material articles and supporting them in an overlapped relationship.

2. An apparatus as set forth in claim 1 further including drive means for moving said first surface means forwardly at a first speed and for moving said second surface means forwardly at a second speed which is greater than said first speed.

3. An apparatus as set forth in claim 2 wherein said means for engaging and sequentially separating the sheet material articles includes a movable member which engages the forwardmost article in the series of sheet material articles and means for moving said movable member at a speed which varies as a function of variations in the speed of movement of said first surface means.

4. An apparatus as set forth in claim 1 wherein said first conveyor means includes first and second spaced apart conveyor belts, said first and second conveyor belts having longitudinally extending upper runs which form at least a portion of said first surface means and are spaced apart by a distance which is greater than the width of a longitudinally extending support portion of a tray and is less than the length of the open end portion of a sheet material article to enable the sheet material articles to extend between and be supported by the upper runs of said first and second conveyor belts.

5. An apparatus as set forth in claim 4 further including transport means for moving a tray with a series of sheet material articles disposed thereon downwardly along a path extending between the upper runs of said first and second conveyor belts to move the series of sheet material articles into engagement with said first and second conveyor belts and to remove the series of sheet material articles from the tray.

6. An apparatus as set forth in claim 5 further including third conveyor means for engaging the second end portion of at least one of the sheet material articles to at least partially support the one sheet material article as it moves from said first conveyor means to said second conveyor means.

7. An apparatus as set forth in claim 1 wherein said means for engaging and sequentially separating the sheet material articles includes a first wheel member disposed adjacent to one side of said first conveyor means, said first wheel member including first peripheral surface means for engaging one side edge portion of the forwardmost article in the series of sheet material articles at a location between the folded and open end portions of the forwardmost article, first support means for supporting said first wheel member for rotation about a first axis extending transversely to said first surface means, a second wheel member disposed adjacent to another side of said first conveyor means, said second wheel member including second peripheral surface means for engaging another side edge portion of the forwardmost article in the series of sheet material articles at a location between the folded and open end portions of the forwardmost article, second support means for supporting said second wheel member for rotation about a second axis extending transcersely to said first surface means, said first and second peripheral surface means being spaced apart by a distance which is less than the longitudinal extents of the folded and open end portions of a sheet material article to enable said first and second wheel members to hold the forwardmost article in the series of sheet material aeticles in an on-edge orientation, and drive means for rotating said first and second wheel members to move the forwardmost article in the series of sheet material articles through the space between said first and second peripheral surfaces means.

8. An apparatus as set forth in claim 7 wherein said means for engaging and sequentially separating the sheet material articles further includes a third wheel member disposed adjacent to said one side of said conveyor means at a location above said first wheel member, said third wheel member including third peripheral surface means for engaging the one side edge portion of the forwardmost article in the series of sheet material articles at a location between said first wheel member and the folded end portion of the forwardmost article, third support means for supporting said third wheel member for rotation about a third axis extending transversely to said first surface means, a fourth wheel member disposed adjacent to the other side of said first conveyor means at a location above said second wheel member, said fourth wheel member including fourth peripheral surface means for engaging the other side edge portion of the forwardmost article in the series of sheet material articles at a location between said second wheel member and the folded end portion of the forwardmost article, fourth support means for supporting said fourth wheel member for rotation about a fourth axis extending transversely to said first surface means, said third and fourth peripheral surface means being spaced apart by a distance which is less than the longitudinal extents of the folded and open end portions of a sheet material article to enable said third and fourth wheel members to hold the forwardmost article in the series of sheet material articles in an on-edge orientation, said drive means being operable to rotate said third and fourth wheel members to move the forwardmost article in the series of sheet material articles through the space between said third and fourth peripheral surface means.

9. An apparatus for receiving an on-edge series of folded sheet material articles from a support tray and for moving the sheet material articles into an overlapping stream, said apparatus comprising first conveyor means for receiving the series of sheet material articles in an on-edge orientation from the tray and for moving the series of sheet material articles forwardly with first end portions of the sheet material articles uppermost, said first conveyor means including first surface means for engaging second end portions of the sheet material articles disposed opposite from the first end portions of the sheet material articles and for supporting the sheet material articles in an on-edge orientation with side surfaces of the articles disposed in abutting engagements, said first conveyor means including first and second spaced apart conveyor belts, said first and second conveyor belts having longitudinally extending upper runs which form at least a portion of said first surface means and are spaced apart by a distance which is greater than the width of a longitudinally extending support portion of a tray and is less than the length of the open end portion of a sheet material article to enable the sheet material articles to extend between and be supported by the upper runs of said first and second conveyor belts, transport means for moving a tray with a series of sheet material articles disposed thereon downwardly along a path extending between the upper runs of said first and second conveyor belts to move the series of sheet material articles into engagement with said first and second conveyor belts and to remove the series of sheet material articles from the tray, means for engaging a forwardmost article in the series of sheet material articles at a location intermediate its end portions to hold the series of sheet material articles in an on-edge orientation and for sequentially releasing the sheet material articles, second conveyor means for receiving each of the released sheet material articles in turn from said first conveyor means and for transporting the sheet material articles in an overlapped stream with the first end portions of adjacent sheet material articles spaced apart, said second conveyor means including second surface means for engaging the side surfaces of the sheet material articles and supporting them in an overlapped relationship, third conveyor means for engaging the second end portion of at least one of the sheet material articles to at least partially support the one sheet material article as it moves from said first conveyor means to said second conveyor means, and means for moving said third conveyor means between an extended condition in which said third conveyor means extends between said first and second conveyor belts and a retracted condition in which third conveyor means is spaced from the area between said first and second conveyor belts to enable a tray to be moved through the area between said first and second conveyor belts by said transport means.

10. An apparatus as set forth in claim 9 further including drive means for driving said first and second conveyor belts at a first speed, for driving said third conveyor means at a second speed which is greater than said first speed, and for driving said second conveyor means at a third speed which is greater than said second speed to thereby enable the spacing between the first end portions of the sheet material articles to be increased as they move forwardly from said first conveyor means to said second conveyor means.

11. An apparatus as set forth in claim 10 wherein said means for engaging and sequentially relasing the sheet material articles includes a first rotatable member disposed adjacent to said first conveyor belt and a second rotatable member disposed adjacent to said second conveyor belt, said drive means being connected with said first and second rotatable members and including means for rotating said members at a peripheral speed which is substantially the same as said first speed to enable a sheet material article to pass between said rotatable members at a rate which is equal to the rate at which the sheet material articles are advanced by said first conveyor means.

12. An apparatus as set forth in claim 11 wherein said means for engaging and sequentially releasing the sheet material articles further includes a third rotatable member disposed adjacent to said first conveyor belt with its axis of rotation forwardly of the axis of rotation of said first rotatable member and a fourth rotatable member disposed adjacent to said second conveyor belt with its axis of rotation ahead of the axis of rotation of said second rotatable member to hold the series of sheet material articles in a forwardly sloping orientation, said drive means including means for driving said third and fourth rotatable members at essentially the same peripheral speed as said first and second rotatable members.

13. A method of handling sheet material articles, said method comprising the steps of providing a support tray on which there is disposed a series of folded sheet material articles in an on-edge orientation with first end portions of the sheet material articles uppermost, transferring the series of sheet material articles from the tray to a first conveyor means with the sheet material articles in an on-edge orientation, said step of transferring the series of sheet material articles to the first conveyor means including the steps of moving the second end portions of the sheet material articles disposed opposite from the first end portions of the sheet material articles into engagement with said first conveyor means and supporting the sheet material articles in an on-edge orientation with the side surfaces of the articles in abutting engagement, holding the forwardmost article in the series of sheet material articles in an on-edge orientation by engaging the forwardmost article at a location intermediate its end portions, sequentially separating a forwardmost article from the series of sheet material articles by engaging the forwardmost article at a location intermediate its end portions, transferring the separated sheet material articles to a second conveyor means with the first end portions of the sheet material articles leading their respective second end portions with the sheet material articles in an overlapping relationship, and transporting the separated sheet material articles in an overlapping stream with the second conveyor means.

14. A method as set forth in claim 13 wherein said step of transferring the sheet material articles from the tray to the first conveyor means includes the step of moving the tray downwardly along a path extending between first and second conveyor belts of said first conveyor means and moving the second end portions of the articles in the series of sheet material articles into engagement with said first and second conveyor belts during downward movement of the tray.

15. A method as set forth in claim 14 wherein said step of transferring the separated sheet material articles to the second conveyor means includes the step of engaging the second end portions of the sheet material articles with a third conveyor means.

16. A method as set forth in claim 15 further including the steps of operating said first conveyor means to move the series of sheet material articles forwardly at a first speed, operating said third conveyor means to move the released sheet material articles forwardly at a second speed which is greater than the first speed, and operating said second conveyor means to move the overlapping stream of sheet material articles forwardly at a third speed which is greater than said second speed.

17. A method as set forth in claim 13 wherein said step of holding the forwardmost article in the series of sheet material articles in an on-edge orientation includes the steps of engaging one side edge portion of the forwardmost article in the series of sheet material articles with a first movable member at a location between the end portions of the forwardmost article and engaging another side edge portion of the forwardmost article in the series of sheet material articles with a second movable member at a location between the end portions of the forwardmost article in the series of sheet material articles, said step of sequentially releasing the articles from the series of sheet material articles including the step of moving said first and second members relative to the series of sheet material articles.

18. An apparatus for receiving an on-edge series of folded sheet material articles and for moving the sheet material articles into an overlapping stream, said apparatus comprising first conveyor means for receiving the series of sheet material articles in an on-edge orientation and for moving the series of sheet material articles forwardly with first end portions of the sheet material articles uppermost, said first conveyor means including first surface means for engaging second end portions of the sheet material articles disposed opposite from the first end portions of the sheet material articles and for supporting the sheet material articles in an on-edge orientation with side surfaces of the articles disposed in abutting engagement, means for engaging a forwardmost article in the series of sheet material articles at a location intermediate its end portions to hold the series of sheet material articles in an on-edge orientation and for sequentially separating a forwardmost sheet material article from the series, and second conveyor means for receiving each of the separated sheet material articles in turn from said first conveyor means and for transporting the sheet material articles in an overlapped stream with the first end portions of adjacent sheet material articles spaced apart and with first end portions of the sheet material articles leading their respective second end portions, said second conveyor means including second surface means for engaging the side surfaces of the sheet material articles and supporting them in an overlapped relationship.

19. Apparatus comprising a substantially vertically moveable tray, means for supporting a series of sheet material articles on said tray in an on-edge angular orientation, first conveyor means for receiving the series of sheet material articles in an on-edge angular orientation from the tray upon relative lowering movement of the tray relative to said first conveyor means, said first conveyor means including first surface means for engaging end portions of the sheet material articles in an on-edge orientation with side surfaces of the articles disposed in abutting engagement, means associated with said first conveyor means for maintaining the angular on-edge orientation of the articles relative to the first conveyor means substantially the same as the angular on-edge orientation at which they were received by the first conveyor means, means for receiving the articles from said first conveyor means and for transporting the sheet material articles in an overlapped stream with end portions of adjacent sheet material articles spaced apart and including second surface means for engaging the side surfaces of the sheet material articles and supporting them in an overlapped relationship.

20. Apparatus as set forth in claim 19 wherein said means for maintaining the angular on-edge orientation of the articles received by said first conveyor means comprises first and second rotatable members adopted to engage a forwardmost article of said series of sheet material articles at a location intermediate its end portions.

21. A method of handling sheet material articles, said method comprising the steps of providing a support tray on which there is disposed a series of folded sheet material articles in an on-edge angular orientation with first end portions of the sheet material articles uppermost, transferring the series of sheet material articles from the tray to a first conveyor means with the sheet material articles in an on-edge orientation, said step of transferring the series of sheet material articles to the first conveyor means including the steps of substantially vertically lowering the second end portions of the sheet material articles disposed opposite from the first end portions of the sheet material articles into engagement with said first conveyor means while supported on the tray, engaging the second end portions with the first conveyor means while continuing lowering movement of the tray to thereby deposit the articles on edge on the first conveyor means, maintaining said articles at substantially said on-edge angular orientation as said articles are transported by said conveyor means, receiving said articles from said conveyor means and thereafter transporting the sheet material articles in an overlapped stream.

22. A method as set forth by claim 21 wherein the step of maintaining said articles at substantially said on-edge angular orientation as the articles are transported by the first conveyor means includes the step of engaging a forwardmost article of said series with one or more rotatable members at a location intermediate the end portions of the article.

23. An apparatus for receiving an on-edge series of folded sheet material articles from a support tray and for moving the sheet material articles into an overlapping stream, said apparatus comprising first conveyor means for receiving the series of sheet material articles in an on-edge orientation from the tray and for moving the series of sheet material articles forwardly with first end portions of the sheet material articles uppermost, said first conveyor means including first surface means for engaging second end portions of the sheet material articles disposed opposite from the first end portions of the sheet material articles and for supporting the sheet material articles in an on-edge orientation with side surfaces of the articles disposed in abutting engagement, said first conveyor means including first and second spaced apart conveyor belts, said first and second conveyor belts having longitudinally extending upper runs which form at least a portion of said first surface means and are spaced apart by a distance which is greater than the width of a longitudinally extending support portion of a tray and is less than the length of the open end portion of a sheet material article to enable the sheet material articles to extend between and be supported by the upper runs of said first and second conveyor belts, transport means for moving a tray with a series of sheet material articles disposed thereon downwardly along a path extending between the upper runs of said first and second conveyor belts to move the series of sheet material articles into engagement with said first and second conveyor belts and to remove the series of sheet material articles from the tray, means for engaging a forwardmost article in the series of sheet material articles at a location intermediate its end portions to hold the series of sheet material articles in an on-edge orientation and for sequentially releasing the sheet material articles, second conveyor means for receiving each of the released sheet material articles in turn from said first conveyor means and for transporting the sheet material articles in an overlapped stream with the first end portions of adjacent sheet material articles spaced apart, third conveyor means for engaging the second end portion of at least one of the sheet material articles to at least partially support the one sheet material article as it moves from said first conveyor means to said second conveyor means, said second conveyor means including second surface means for engaging the side surfaces of the sheet material articles and suporting them in an overlapped relationship, said second conveyor means including a third conveyor belt disposed in alignment with said first conveyor belt and a fourth conveyor belt disposed in alignment with said second conveyor belt, and said third conveyor means including a fifth conveyor belt having a longitudinally extending upper run which extends from the space between said first and second conveyor belts through the space between said third and fourth conveyor belts to support a sheet material article as it moves forwardly from said first and second conveyor belts into engagement with said third and fourth conveyor belts.

24. A method of handling sheet material articles, said method comprising the steps of providing a support tray on which there is disposed a series of folded sheet material articles in an on-edge orientation with first end portions of the sheet material articles uppermost, transferring the series of sheet material articles from the tray to a first conveyor means with the sheet material articles in an on-edge orientation, said step of transferring the series of sheet material articles to the first conveyor means including the steps of moving the tray downwardly along a path extending between first and second conveyor belts of said first conveyor means and moving the second end portions of the articles in the series of sheet material articles into engagement with said first and second conveyor belts during downward movement of the tray, moving a second conveyor means from an extended condition in which said second conveyor means is extended into the space between the first and second conveyor belts to a retracted condition in which said second conveyor means is disposed to one side of the space between the first and second conveyor belts prior to performing said step of moving the tray downwardly along a path extending between the first and second conveyor belts, supporting the sheet material articles on said first conveyor means in an on-edge orientation with the side surfaces of the articles in abutting engagement, holding the forwardmost article in the series of sheet material articles in an on-edge orientation by engaging the forwardmost article at a location intermediate its end portions, sequentially releasing the articles from the series of sheet material articles, transferring the released sheet material articles to a third conveyor means with the sheet material articles in an overlapping relationship including the steps of engaging the second end portions of the sheet material articles with the second conveyor means and transporting the released sheet material articles in an overlapping stream with the third conveyor means.

25. An apparatus for receiving an on-edge series of folded sheet material articles from a support tray and for moving the sheet material articles into an overlapping stream, said apparatus comprising first conveyor means for receiving the series of sheet material articles in an on-edge orientation from the tray and for moving the series of sheet material articles forwardly with first end portions of the sheet material articles uppermost, said first conveyor means including first surface means for engaging second end portions of the sheet material articles disposed opposite from the first end portions of the sheet material articles and for supporting the sheet material articles in an on-edge orientation with side surfaces of the articles disposed in abutting engagement, means for engaging a forwardmost article in the series of sheet material articles at a location intermediate its end portions to hold the series of sheet material articles in an on-edge orientation and for sequentially releasing the sheet material articles, said means for engaging and sequentially releasing the sheet material articles including a first wheel member disposed adjacent to one side of said first conveyor means, said first wheel member including first peripheral surface means for engaging one side edge portion of the forwardmost article in the series of sheet material articles at a location between the folded and open end portions of the forwardmost article, first support means for supporting said first wheel member for rotation about a first axis extending transversely to said first surface means, a second wheel member disposed adjacent to another side of said first conveyor means, said second wheel member including second peripheral surface means for engaging another side edge portion of the forwardmost article in the series of sheet material articles at a location between the folded and open end portions of the forwardmost article, second support means for supporting said second wheel member for rotation about a second axis extending transversely to said first surface means, said first and second peripheral surface means being spaced apart by a distance which is less than the longitudinal extents of the folded and open-end portions of a sheet material article to enable said first and second wheel members to hold the forwardmost article in the series of sheet material articles in an on-edge orientation, said first and second peripheral surface means each including a plurality of protrusions which are spaced apart by a distance which is at least as great as the thickness of one of the sheet material articles to facilitate the sequential releasing of the sheet material articles, drive means for rotating said first and second wheel members to move the forwardmost article in the series of sheet material articles through the space between said first and second peripheral surface means, and second conveyor means for receiving each of the released sheet material articles in turn from said first conveyor means and for transporting the sheet end portions of adjacent sheet material articles spaced apart and the first end portions of the sheet material articles leading their respecting second end portions, said second conveyor means including second surface means for engaging the side surfaces of the sheet material articles and supporting them in an overlapped relationship.

* * * * *